(12) United States Patent
MacGregor

(10) Patent No.: US 6,574,958 B1
(45) Date of Patent: Jun. 10, 2003

(54) SHAPE MEMORY ALLOY ACTUATORS AND CONTROL METHODS

(75) Inventor: Roderick MacGregor, Antioch, CA (US)

(73) Assignee: NanoMuscle, Inc., Antioch, CA (US)

( * ) Notice: Subject to any disclaimer, the term of this patent is extended or adjusted under 35 U.S.C. 154(b) by 0 days.

(21) Appl. No.: 09/637,713

(22) Filed: Aug. 11, 2000

Related U.S. Application Data

(60) Provisional application No. 60/148,514, filed on Aug. 12, 1999, provisional application No. 60/148,515, filed on Aug. 12, 1999, provisional application No. 60/148,516, filed on Aug. 12, 1999, and provisional application No. 60/148,517, filed on Aug. 12, 1999.

(51) Int. Cl.[7] .............................. F01B 29/10
(52) U.S. Cl. .......................... 60/527; 60/528
(58) Field of Search ................... 60/527, 528

(56) References Cited

U.S. PATENT DOCUMENTS

| 348,841 A | 9/1886 | Hainley |
| 1,658,669 A | 2/1928 | Cohn et al. |
| 2,518,941 A | 8/1950 | Satchwell et al. |
| 2,975,307 A | 3/1961 | Schroeder et al. |
| 3,452,175 A | 6/1969 | Wilkes |
| 3,452,309 A | 6/1969 | Wilkes |
| 3,641,296 A | 2/1972 | Schwarz |
| 4,150,544 A | * 4/1979 | Pachter ................ 60/527 |
| 4,579,006 A | 4/1986 | Hosoda et al. ......... 73/862.38 |
| 4,586,335 A | 5/1986 | Hosoda et al. |
| 4,751,821 A | 6/1988 | Birchard |

(List continued on next page.)

FOREIGN PATENT DOCUMENTS

| DE | 42 09 815 A1 | 9/1993 |
| DE | 195 09 177 A1 | 9/1996 |
| EP | 0 147 491 | 7/1985 |
| FR | 2730766 | 8/1996 |
| GB | 2 093 589 A | 9/1982 |
| GB | 2 334 046 A | 8/1999 |
| WO | 98/08355 | 2/1998 |

OTHER PUBLICATIONS

K. Ikuta, "Micro/miniature shape memory alloy actuator", *IEEE Robotics and Automation*, 3, 2156–2161 (1990).
D. Grant et al., "Variable structure control of shape memory alloy actuators", *IEEE Control Systems*, 80–88 (Jun. 1997).
M. Hashimoto et al., "Application of shape memory alloy to robotic actuators", *J. Robotic Systems*, 2(1), 3–25 (1985).
S. Hirose et al., "A new design of servo–actuators based on the shape memory effect", *Theory and Practice of Robots and Manipulators*, 339–349 (1984).
K. Ikuta et al., "Shape memory alloy servo actuator system . . . ", *IEEE Robotics and Automation*, 1, 427–430 (1988).
K. Ikuta et al., "Mathematical model and experimental verification . . . ", *IEEE Robotics and Automation*, 4, 103–108 (1991).
K. Kuribayashi, "A nw actuator of a joint mechanism using TiNi alloy wire", *Int. J. Robotics Res.*, 4(4), 47–58 (1986).

*Primary Examiner*—Hoang Nguyen
(74) *Attorney, Agent, or Firm*—Cooley Godward LLP

(57) ABSTRACT

This invention provides stroke-multiplying shape memory alloy actuators and other actuators using electromechanically active materials [collectively referred to in this application as SMA actuators] providing stroke multiplication without significant force reduction, that are readily miniaturizable and fast acting, and their design and use; economical and efficient control and sensing mechanisms for shape memory alloy actuators (including conventional shape memory alloy actuators as well as the stroke-multiplying SMA actuators of this invention) for low power consumption, resistance/obstacle/load sensing, and accurate positional control; and devices containing these actuators and control and sensing mechanisms.

10 Claims, 9 Drawing Sheets

U.S. PATENT DOCUMENTS

| | | | |
|---|---|---|---|
| 4,806,815 A | 2/1989 | Honma | 310/307 |
| 4,811,564 A | 3/1989 | Palmer | |
| 4,841,730 A | 6/1989 | McDonald | |
| 4,977,886 A | 12/1990 | Takehana et al. | 128/4 |
| 5,127,228 A * | 7/1992 | Swenson | 60/527 |
| 5,172,551 A | 12/1992 | Nakajima et al. | |
| 5,235,225 A | 8/1993 | Colgate et al. | |
| 5,312,152 A | 5/1994 | Woebkenberg, Jr. et al. | |
| 5,344,506 A | 9/1994 | DeAngelis | 148/402 |
| 5,556,370 A | 9/1996 | Maynard | 600/151 |
| 5,563,466 A | 10/1996 | Rennex et al. | |
| 5,685,148 A | 11/1997 | Robert | 60/527 |
| 5,763,979 A | 6/1998 | Mukherjee et al. | 310/306 |
| 5,901,554 A | 5/1999 | Greschik | |
| 6,218,762 B1 | 4/2001 | Hill et al. | |
| 6,326,707 B1 | 12/2001 | Gummin et al. | 310/12 |
| 6,327,855 B1 | 12/2001 | Hill et al. | |
| 6,333,583 B1 | 12/2001 | Mahadevan et al. | |

* cited by examiner

SHAPE MEMORY ALLOY ACTUATORS AND CONTROL METHODS

CROSS-REFERENCE TO RELATED APPLICATIONS

This application claims the priority under 35 USC 119(e) of U.S. Provisional Applications Nos. 60/148,514, entitled "SMA Actuator Design", 60/148,515, entitled SMA Actuator with Teflon Guides", 60/148,516, entitled "Time Domain Resistance Analysis for Realtime SMA Actuator Control", and 60/148,517, entitled "PWM Multiplexing Controller for SMA Actuator Arrays", all filed on Aug. 12, 1999. These applications are incorporated by reference into this application.

BACKGROUND OF THE INVENTION (a) Field of the Invention

This invention relates to shape-memory alloy (SMA) actuators and other actuators using electromechanically active materials [collectively referred to in this application as SMA actuators] and to methods for their control. In particular, this invention relates to SMA actuators that are capable of miniaturization to achieve fast (sub-second) response, and to control methods for SMA actuators in general, and also in particular for the miniaturizable SMA actuators of this invention for low power consumption, resistance/obstacle sensing, and positional control.

(b) Description of Related Art

A class of materials was discovered in the 1950s that exhibit what is known as the shape memory effect. See, for example, K. Otsuka, C. M. Wayman, "*Shape Memory Materials*", Cambridge University Press, Cambridge, England, 1998, ISBN 0-521-44487X. These materials exhibit a thermoelastic martensite transformation; i.e. they are pliable below a certain transition temperature because the material is in its martensite phase and can be easily deformed. When their temperature is raised above the transition temperature the material reverts to its austenite phase and its previous shape, generating a large force as it does so. Example of such materials are approximately 50:50 atom percent titanium-nickel (TiNi) alloys, optionally containing small quantities of other metals to provide enhanced stability or to alter the martensite-austenite transition temperatures; and these can be formulated and treated to exhibit the shape memory effect. Other such alloys include Cu/Al/Ni and Cu/Al/Zn alloys, sometimes known as β-brasses. Such alloys are generically referred to as shape memory alloys (SMA) and are commercially available from a number of sources in wire form, with diameters from as low as 37 μm to 1 mm or greater. See, for example, Dynalloy Corp., "Technical Characteristics of Flexinol Actuator Wires", Technical Information Pamphlet Dynalloy Corp., 18662 MacArthur Boulevard, Suite 103, Irvine Calif. 92715, USA.

SMA wires are wires of shape memory alloy that are treated such that they can be easily stretched along their longitudinal axis while in the martensite phase, thus re-arranging their atomic crystalline structure. Once stretched they remain that way until they are heated above their austenite transition temperature, at which point the crystalline structure is restored to its original (remembered) austenite configuration. This reversion not only returns the wire to its original length, but also generates a large force, typically on the order of 50 Kgf/mm$^2$ cross-sectional area, depending on the alloy and its treatment. Because of the large available force per cross-sectional area, SMA wires are normally produced. in small diameters. For example, a 100 μm diameter wire can deliver about 250 g of force. To obtain more force, thicker wires or multiple wires are required.

Although SMAs have been known since 1951, they has found limited commercial actuator applications due to some inherent limitations in the physical processes which create the shape memory properties. This lack of commercial applications is due to a combination of the following factors:

(1) Limited Displacement

A TiNi SMA wire can contract by at most 8% of its length during the thermoelastic martensite to austenite transition. However, it can only sustain a few cycles at this strain level before it fails. For a reasonable cycle life, the maximum strain is in the 3–5% range. As an example, for an actuator with reasonable cycle life, it requires over 25 cm of SMA wire to produce 1 cm of movement.

(2) Minimum Bend Radius

An obvious solution to packaging long lengths of SMA into small spaces is to use some kind of pulley system. Unfortunately SMA wires can be damaged if they are routed around sharp bends. Typically an SMA wire should not be bent around a radius less than fifty times the wire diameter. As an example, a 250 μm diameter wire has a minimum bending radius of 1.25 cm. It should be noted that the term "minimum bending radius" as used here means the minimum radius within which an SMA wire can be bent and still be capable of repeated austenite-martensite cycling without damage. The addition of a large number of small pulleys makes the system mechanically complex, eliminating one of the attractions of using SMA in the first place. Also the minimum bend radius requirement places a lower limit on actuator size.

(3) Cycle Time

An SMA wire is normally resistively heated by passing an electric current through it. The wire then has to cool below its transition temperature before it can be stretched back to its starting position. If this cooling is achieved by convection in still air, then it can take many seconds before the actuator can be used again. The 250 μm wire discussed above has a best cycle time of about 5 seconds or more. Thus, as an example, Stiquito, an SMA powered walking insect [J. M. Conrad, J. W. Mills, "Stiquito: Advanced Experiments with a Simple and Inexpensive Robot", IEEE Computer Society Press, Los Alamitos Calif., USA, ISBN 0-8186-7408-3] achieves a walking speed of only 3–10 cm/min. Since the rate of cooling depends on the ratio of the surface area of the wire to its volume, changes in wire diameter dramatically affect the cycle time.

To overcome these limitations designers of SMA based actuators have typically used long straight wires or coils. See, for example, M. Hashimoto, M. Takeda, H. Sagawa, I. Chiba, K. Sato, "Application of Shape Memory Alloy to Robotic Actuators", *J. Robotic Systems*, 2(1), 3–25 (1985); K. Kuribayashi, "A New Actuator of a Joint Mechanism using TiNi Alloy Wire", *Int. J. Robotics*, 4(4), 47–58 (1986); K. Ikuta, "Micro/Miniature Shape Memory Alloy Actuator", *IEEE Robotics and Automation*, 3, 2151–2161 (1990); and K. Ikuta, M. Tsukamoto, S. Hirose, "Shape Memory Alloy Servo Actuator with Electrical Resistance Feedback and Application for Active Endoscope", *Proc. IEEE Int. Conf. on Robotics and Information*, 427–430 (1988). Clearly, in many applications, especially where miniaturization is desired, it is impractical to use long straight wires. Coils, although greatly increasing the stroke delivered, significantly decrease the available force; and, to compensate for the drop in force, thicker wires are used which reduce the responsiveness of the resulting actuator, making it unsuitable for many applications.

Other mechanisms commonly used to mechanically amplify the available displacement, such as those disclosed in D. Grant, V. Hayward, "Variable Control Structure of Shape Memory Alloy Actuators", *IEEE Control Systems*, 17(3), 80–88 (1997) and in U.S. Pat. No. 4,806,815, suffer from the same limitation on available force, again leading to the requirement for thicker wires and the attendant problems with cycle time.

As discussed above, SMA materials can be used as the motive force for an actuator [See, for example, T. Waram, "*Actuator Design Using Shape Memory Alloys*", 1993, ISBN 0-9699428-0-X], whose position can be controlled by monitoring the electrical resistance of the alloy. See, for example, K. Ikuta, M. Tsukamoto, S. Hirose, "Shape Memory Alloy Servo Actuator with Electrical Resistance Feedback and Application for Active Endoscope", discussed above.

A common method of heating SMA actuators to their transition temperature is pulse width modulation (PWM). In this scheme, a fixed voltage is applied for a percentage of a pre-set period. As the percentage on-time to off-time in a single period (referred to as the duty cycle) is changed, the aggregate amount of power delivered to the SMA can be controlled. This scheme is popular because of the ease with which it can be implemented in digital systems, where a single transistor is all that is required to drive an actuator, obviating the need for digital-to-analog conversion and the associated amplifiers.

In a simple example, a PWM generator supplies PWM pulses to the SMA element at a duty cycle and period specified by a digital controller. During the off period of the PWM pulse, a resistance measuring system measures the resistance of the SMA which is sampled and then held in a sample-and-hold system. This measurement is made in the off cycle because the PWM pulse can be quite short and the controller might not sample the SMA when the pulse is on. Finally, the analog signal in the sample-and-hold system is converted to digital form by an analog-to-digital (A-D) converter, from which it can then be read by the controller. This value is then used by an algorithm in the controller to vary the duty cycle of the PWM generator to achieved a desired position of the SMA element. In systems with more than one SMA element, all of the systems other than the controller need to be replicated for each SMA element, which leads to large, complex and expensive control systems.

Several schemes have been proposed to avoid this replication. The most common is to multiplex the A-D converter across a number of sample & hold circuits, thus only requiring one A-D converter. Another scheme, described in U.S. Pat. No. 5,763,979, uses electronic switches in a row and column configuration to isolate a single SMA element and applies a PWM pulse to each element in turn. This allows for the resistance measuring, sample and hold and A-D subsystems to be shared across all actuators, and also has the advantage of reducing the number of wires required to interconnect the devices. Unfortunately the scheme also doubles the number of high current switching devices since each actuator requires two such channels as opposed to only one in the conventional scheme. These switches are normally the physically largest element of such control systems because of their need to dissipate substantial heat due to their high current operation. So, although this scheme reduces the number of wires, it actually increases the size and complexity of the controller subsystem.

The transition from the martensite (low temperature) phase to the austenite (high temperature) phase in SMAs does not happen instantaneously at a specific temperature but rather progresses incrementally over a temperature range. FIG. 1 shows the relationship between displacement and temperature, indicating the austenite start $A_s$ and austenite finish $A_f$ temperatures, as well as the martensite start and finish temperatures $M_s$ and $M_f$ respectively. In the temperature range indicated by $\Delta T$ the alloy consists of a mixture of austenite and martensite. As can be seen, substantially no change in length occurs below $A_s$, and substantially no further change in length occurs above $A_f$, as the SMA is heated. Similarly, on cooling substantially no change in length occurs above $M_s$, and substantially no further change in length occurs below $M_f$, however, there is typically substantial hysteresis in the length-temperature curve. As discussed in K. Ikuta, M. Tsukamoto, S. Hirose, "Shape Memory Alloy Servo Actuator with Electrical Resistance Feedback and Application for Active Endoscope", discussed above, and U.S. Pat. No. 4,977,886, there is a relationship between the electrical resistance of an SMA component and its temperature, as is shown in FIG. 2, which is shown for an SMA having an $M_f$ above room temperature. As can be seen, within the shaded region between Rmin and Rmax the resistance can be used as an analog for the SMA temperature and hence it is possible to deduce the percentage transformation between the two phases based entirely on the resistance value with no direct measurement of temperature, since the resistance-temperature curve does not display significant hysteresis. However, due to the large position-temperature hysteresis illustrated in FIG. 1, knowledge of the temperature alone is not sufficient to deduce position.

However, if two actuators are arranged in an antagonistic fashion, a number of schemes can be used to compensate for the hysteresis. A common scheme described in Dynalloy Corp., "Technical Characteristics of Flexinol Actuator Wires" and U.S. Pat. No. 4,977,886 uses the normalized resistance from both actuators in combination to compensate for the hysteresis. All of these position control schemes rely upon an a priori knowledge of Rmax and Rmin (see FIG. 2). These values change over time as the alloy ages, and also with environmental factors, such that the system has to be recalibrated before each use for useful position control. Calibration is achieved either by the attachment of external sensors to compute Rmax and Rmin at known measured minimum and maximum displacements or, as in U.S. Pat. No. 4,977,886, by applying a current large enough and long enough such that the temperature will exceed $A_f$ and record the minimum and peak resistances encountered. The former calibration scheme is impractical for many systems where continuous, low cost operation is required. The latter scheme relies upon knowledge of the physical dimensions of the SMA element, and also its current environment and state (e.g. austenite or martensite) so that the magnitude and duration of the calibration pulse can be calculated.

The disclosures of all documents cited in this section and elsewhere in this application are incorporated by reference into this application.

It would be desirable to develop SMA actuators that are capable of providing substantially the full force of the SMA wires comprising them while achieving a greater stroke (contraction) than is achievable by an SMA wire of the length of the actuator (stroke multiplication without significant force reduction); SMA actuators that are miniaturizable and fast acting; and economical and efficient control and sensing mechanisms for SMA actuators (including conventional shape memory alloy actuators as well as the stroke-multiplying SMA actuators of this invention) for low power consumption, resistance/obstacle/load sensing, and accurate positional control.

SUMMARY OF THE INVENTION

This invention provides stroke-multiplying shape memory alloy actuators and other actuators using electromechanically active materials [collectively referred to in this application as SMA actuators] providing stroke multiplication without significant force reduction, that are readily miniaturizable and fast acting, and their design and use; economical and efficient control and sensing mechanisms for shape memory alloy actuators (including conventional shape memory alloy actuators as well as the stroke-multiplying SMA actuators of this invention) for low power consumption, resistance/obstacle/load sensing, and accurate positional control; and devices containing these actuators and control and sensing mechanisms.

In a first aspect, this invention provides a stroke-multiplying shape memory alloy actuator. In embodiments of this first aspect of the invention, the actuator comprises multiple rigid members and shape memory alloy wires.

In a second aspect, the invention provides a stroke-multiplying shape memory alloy actuator comprising a single shape memory alloy wire.

In a third aspect, this invention provides multiplexed control and sensing mechanisms for shape memory actuators.

In a fourth aspect, the invention provides control and sensing mechanisms for, and methods for controlling, shape memory alloy actuators using resistive feedback, in which the change in resistance of the actuator with time as the actuator is energized is used to generate the control information for the actuator. These control and sensing mechanisms and methods may be used for calibration of actuators, executing position control functions, measuring applied loads on actuators, and detecting collisions or mechanical obstructions encountered. by, or system failures in, actuators. In a preferred control mechanism, measurement of the discharge time of a capacitor connected parallel to the actuator is used to measure the resistance of the actuator.

DETAILED DESCRIPTION OF THE INVENTION

Definitions and General Parameters

Figure 1:
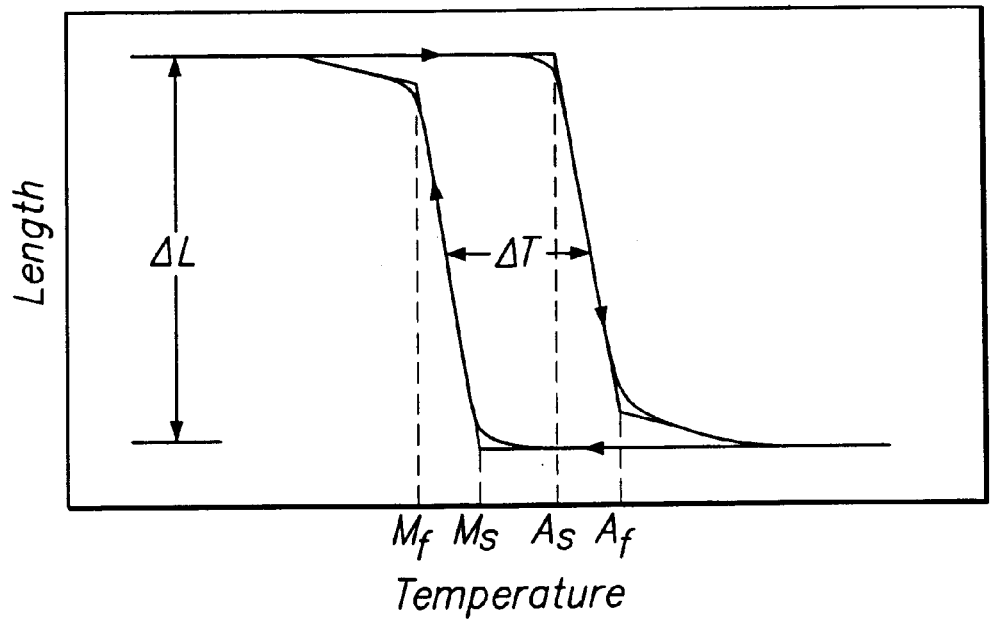
FIG. 1 shows a length versus temperature graph for a typical SMA element.
Figure 2:
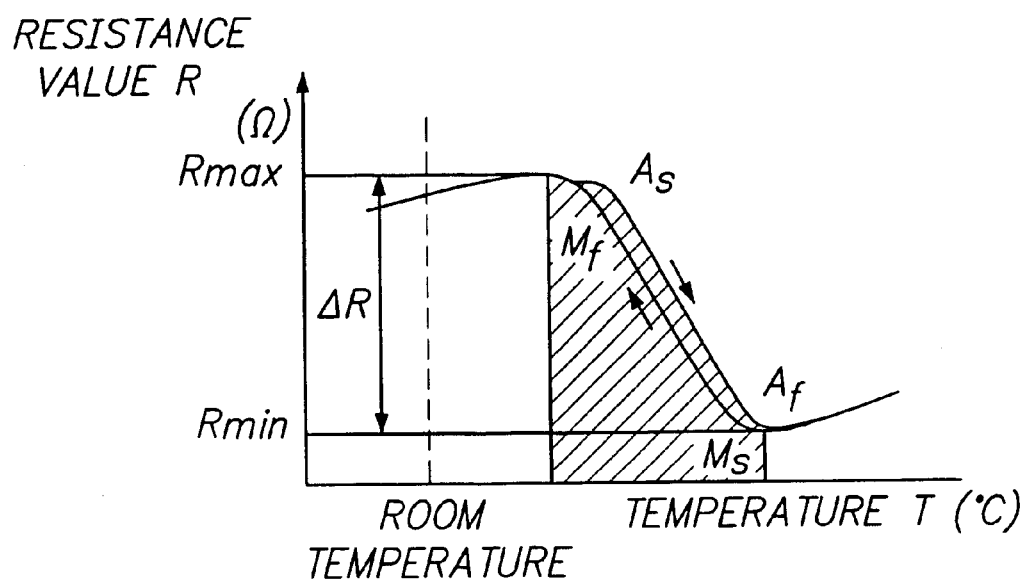
FIG. 2 shows a resistance versus temperature graph for a typical SMA element.

A "shape memory alloy" or "SMA" is an alloy that exhibits a thermoelastic martensite transformation, such that it can be deformed while in the martensite phase and the deformation is recovered when the alloy returns to the austenite phase. SMAs suitable for room temperature applications of this invention are those that have an austenite-martensite transition range somewhat above expected ambient temperature, say a martensite finish temperature of 30–50° C., so that the SMA will remain in its martensite phase in the absence of applied heating, and an austenite finish temperature that is low enough to be compatible with common engineering plastics, say an austenite finish temperature of 80–100° C., to minimize the amount of heating (e.g. electrical energy input to the SMA) required to complete the martensite-to-austenite transition. Such alloys are readily commercially available. Alloys with other transition temperature ranges may be chosen for actuators designed to operate at decreased (e.g. below 0° C.) or elevated (e.g. above 100° C.) temperature environments, and a person of ordinary skill in the art will have no difficulty, having regard to that skill and this disclosure, in choosing a suitable SMA for a desired purpose. It is well known that, when an SMA element, such as an SMA wire, is deformed within the recoverable range of strain below its $M_f$ temperature, and then heated to above the $A_f$ temperature, it will revert to its original undeformed shape. However, re-cooling of the element below the $M_f$ temperature again will not cause reversion to the deformed shape spontaneously—the shape memory effect is a one-way effect. Thus a stress, or bias, needs to be applied to the SMA element for it to revert to the deformed shape as it re-cools below the $M_f$ temperature. Although it will not be generally discussed below in relation to the SMA actuators of this invention, it is to be assumed that a bias is or can be applied to the actuator to cause reversion to the deformed martensitic state as the SMA elements of the actuator cool below the $M_f$ temperature. This bias may be applied either by a spring (a constant bias application, where the actuator has to overcome the force of the spring to cause motion of the actuator as it heats; or by an opposing actuator, where typically one is heated and the other is unheated, but each may be heated to differing extents for precise control). The spring bias is economical, but has the disadvantage that a part of the actuator force is absorbed by the spring, leaving less available for the actuator to apply to an external load; the opposed actuator bias offers greater force availability, since the opposed actuator when unheated takes little force to move, and greater position sensitivity when both are differentially energized, but at a cost in complexity of control and increased power consumption. This is well known in the art; and the SMA actuators of this invention may be used in either mode.

SMA "wire" as used in this application refers to SMA material of elongate form, capable of contraction/elongation along the long axis. Thus the term "wire" does not imply a circular cross-section, although that will be the typical cross-section, but includes cross-sections that may be elliptical, square, rectangular, or the like.

The "stroke" of an SMA actuator is the change in distance between the fully extended length and the fully contracted length of the actuator. If the actuator contains a limit stop(s) to limit either contraction and/or extension of the actuator, then the "stroke" will be the distance between the limit stop(s), which may be less than the "stroke" if no limit stop(s) were present.

A "stroke multiplying" SMA actuator is an SMA actuator in which the stroke of the actuator is greater than the contraction or extension of an SMA wire of the external length of the actuator in the direction of its extension or contraction.

In a first aspect, this invention provides stroke multiplying SMA actuators, i.e. SMA actuators that are capable of providing substantially the full force of the SMA wires comprising them while achieving a greater stroke than is achievable by an SMA wire of the length of the actuator ("length" being defined as the length of the actuator in the direction of the axis of the SMA wires), thereby achieving stroke multiplication without significant force reduction.

This stroke multiplication without significant force reduction enables thin SMA wires to be employed resulting in greatly increased responsiveness due to the non-linear dependence of wire cooling speed on wire diameter. As is well-known in the SMA actuator art, per unit length, the mass of wire to be cooled is proportional to the cross-sectional area of the wire (a function of the square of the wire diameter), while the cooling rate is proportional to the surface area of the wire (a function of the diameter). In fact, this ratio is further complicated by the thermal conductivity of the wire itself, but it can be seen that the rate of cooling of an SMA wire from its $A_f$ temperature to its $M_f$ temperature decreases substantially with decrease in wire diameter. This decreases the cycle time of an SMA actuator, since the heat-up time from the $M_f$ temperature to the $A_f$ temperature will always be substantially shorter than the cool-down time provided that sufficient power is applied to achieve a rapid heating rate. For example, while a 250 $\mu$m diameter wire actuator has a cycle time of 6–7 sec or more, a 50 $\mu$m diameter wire actuator has a cycle time of less than about 1 sec, and a 37 $\mu$m diameter wire actuator has a cycle time of about 0.4 sec.

The basic design of the stroke multiplying SMA actuator comprises a plurality of parallel, including concentrically arranged, rigid (i.e. non-SMA) members that are free to slide relative to one another, each connected one to another by SMA wires in such a way that the stroke of the actuator is substantially equal to the sum of the strokes of the individual SMA wires.

Figure 3:
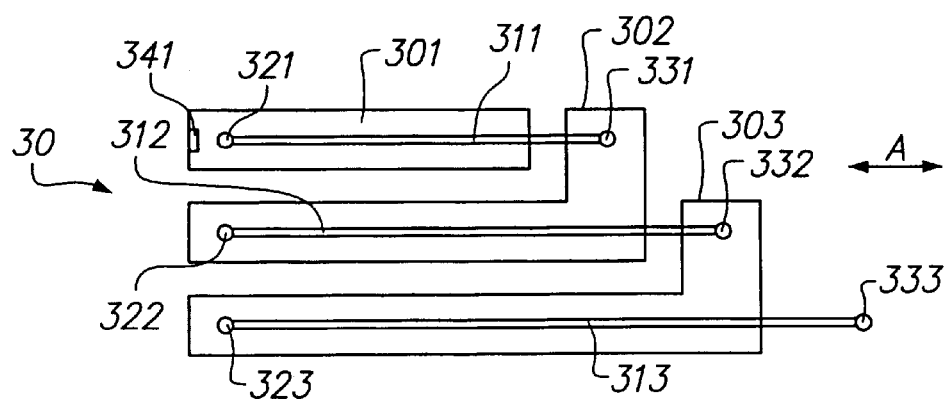
FIG. 3 shows a first embodiment of an SMA actuator of this invention.

In a first embodiment, as shown in FIG. 3, the slidable rigid members 301, 302, 303 and the SMA wires 311, 312, 313, attached at points 321 and 331, 322 and 332, 323 and 333, respectively, of the actuator shown generally at 30, are arranged such that, when the SMA wires 311, 312, 313 contract, each pulls on one end of a rigid member the other end of which is attached to the next wire. In this way the displacement of one wire is added to the next one in sequence. One end 341 of rigid member 301 may be attached by any suitable means to a point, and the end 333 of wire 313 may be attached to another point, the two points being either both movable or, more usually, one movable and one fixed, so that the distance between the points is reduced when the wires 311, 312, 313 contract. The double-headed arrow A indicates the direction of movement, with contraction of the SMA wires causing a contraction of the distance between points 321 and 333. An arbitrary number of wires and members can be combined to achieve any desired displacement.

For example, if member 301 is fastened rigidly to a substrate and members 302 and 303 are slidable with respect to each other and to member 301, when the SMA wires are heated and contract, and each contracts about 3%, the ultimate contraction of the assembly, from the attachment point 341 to the attachment point 333, will be about 9%, representing about a three-fold multiplication of displacement with no diminution of the force exerted except for the little lost to friction within the actuator. The design thus delivers the benefits of a long straight wire but in a more compact form, without reducing available force. In addition, the fact that all wires are straight means that the issue of minimum bend radius of the SMA wire is moot, making it possible to miniaturize the assembly to a scale of a few centimeters, for example down to 1 cm or less, and potentially down to microscopic scale.

The rigidity of each of the members needs to be sufficient that the actuator will not buckle as the wires contract, but because the actuator can be encased in a casing preventing buckling of the members (if such a casing if made from or coated with a suitable low-friction polymeric material, such as PTFE or another fluoropolymer, it will also act to provide a low-friction environment for the sliding of the rigid members), no unusual strength is required. An actuator of this type (side-by-side arrangement), as is apparent from the drawing, can be made shallow compared to its length and width, making it especially useful in a confined flat space situation.

Power supply to the SMA wires 311, 312, 313 may be individual to each wire, allowing maximum control of movement and spread of peak power draw (if the wires are energized sequentially, since the current required to heat a wire to its $A_f$ temperature is greater than the current required to hold the wire above its $A_f$ temperature once that temperature is reached). This is an important consideration in battery powered devices where the life of the battery is dependent to an extent on the rate of current drain; but there is a cost in the need for numerous leads and increased control capacity. Power supply may also, more usually, be from one end of the actuator to the other in a single run, so that only two leads are required and the control simplified. In this situation, points 331 and 332 on member 302, and points 332 and 323 on member 303 need to be electrically connected so that a current may flow from point 321 to point 333, thereby causing all three wires 311, 312, 313 to contract simultaneously when a voltage is applied to points 321 and 333. If the rigid members 301, 302, 303 are non-conductive, appropriate electrical paths (jumper wires) must be provided to make the required electrical connection. If the rigid members are themselves conductive and the SMA wires fastened to them in an electrically conductive way, then the rigid members themselves will serve as the jumpers, but this requires that the SMA wires themselves be electrically insulated or spaced apart from the rigid members except at the attachment points 321, 322, 323, 331, 332 to ensure that current passes completely through the SMA wires.

Figure 4A:
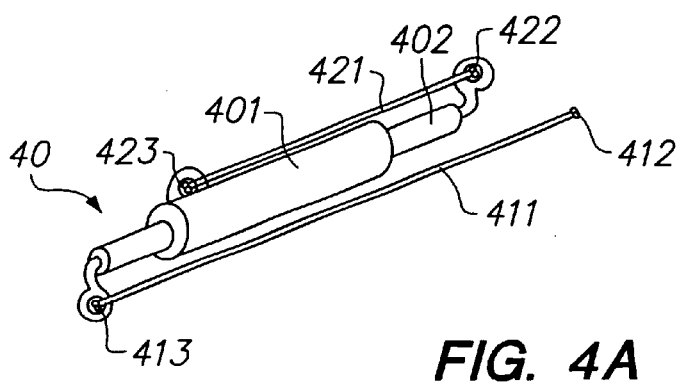
FIG. 4A shows a second embodiment of an SMA actuator of this invention.
Figure 4B:
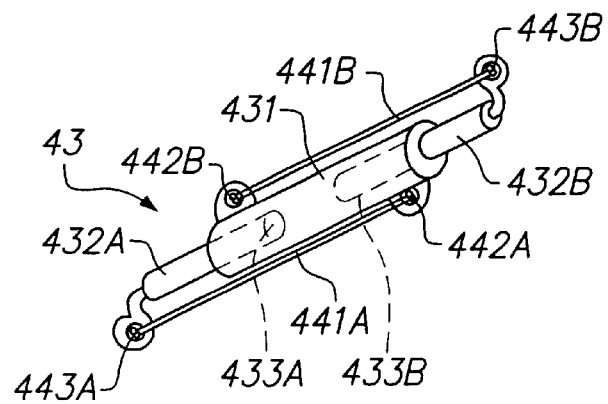
FIG. 4B shows an alternative second embodiment of an SMA actuator of this invention.

In a second embodiment, to further minimize the space requirements of the actuator the rigid members can be arranged as concentric tubes with the SMA wires mounted on the outside of the tube as shown in FIGS. 4A and 4B. In FIG. 4A, the actuator shown generally at 40 comprises two tubes (or an outer tube and an inner rod), with the outer tube 401 being anchored to some suitable structure (not shown) and an end 412 of SMA wire 411 connected in a tendon-like fashion to the load to be acted upon (also not shown). Inner tube/rod 402 slides within outer tube 401. The other end of wire 411 is attached to an attachment point 413 at one end of inner tube/rod 402, while a second wire 421 is attached to the other end of inner tube/rod 402 at attachment point 422 and is also attached to an attachment point 423 rigidly connected to outer tube 40 1. Typically the inner tube/rod 402 is electrically conductive thereby completing an electrical path from point 412 to point 423 through both SMA wires in series, with the power leads connected to points 412 and 423. The outer tube may be non-conductive; but must be insulated or electrically separated from the inner tube if it is conductive. In FIG. 4B, the actuator shown generally at 43 consists of an outer tube 431 with a pair of opposed inner tubes/rods 432A, 432B, each connected to a different structure (not shown) in order to exert a force between them. An end of SMA wire 441A is connected at attachment point 442A to outer tube 431 and the other end is connected at attachment point 443A to the exposed end of inner tube/rod 432A. Contraction of wire 441A thus urges inner tube/rod 432A into outer tube 431. Similarly, contraction of wire 441B urges inner tube/rod 432B into outer tube 431 from the opposite direction. This creates an opposed actuator, and if the inner ends 433A and 433B were linked to a structure to be moved (not shown) through an aperture in outer tube 431, that structure could be moved in one direction or the other along the axis of the outer tube 431 by applying power to one or other of wires 441A and 441B. This configuration can be modified into a stroke multiplying SMA actuator by an actuator of the type shown generally in FIG. 4A for each of the half-elements of the actuator 43.

Clearly both configurations of these concentric tube actuators can be extended by adding additional concentric tubes to the device to achieve larger displacements. To increase the available force delivered multiple parallel SMA wires can be used on the same framework without any penalty in cycle time.

A prototype set of actuators has been constructed at a scale suitable for implementing a six-legged Stiquito-like walking robot. The resulting device can walk at a speed of approximately 1 cm/sec, which compares very favorably with Stiquito's 3–10 cm/min. In this embodiment, the concentric tubes used in these actuators were made from aluminum. The outer tube had a length of 4 cm, an outside diameter of 2.4 mm, and the actuator produced a stroke of at least 3.2 mm. The SMA wire was anchored to the aluminum tubes using small brass nuts and bolts of size 00–90. The SMA used was a Flexinol TiNi alloy (Dyalloy, Inc.), with a diameter of 50 $\mu$m, producing a force of 35 g. The SMA was heated using a 1 KHz PWM signal that delivered a maximum of 110 mA at an amplitude of 6V. Certain of the actuators (those responsible for bearing the weight of the robot) had two parallel SMA wires attached to the tubes and so delivered a force of 70 g. The cycle time for both types of actuator was approximately 0.7 sec.

In a more preferred third embodiment, the actuator consists of a set of stacked parallel plates electrically insulated from one another and joined by SMA wires. The construction of such an actuator is shown in FIGS. 5 through 8.

Figure 5:
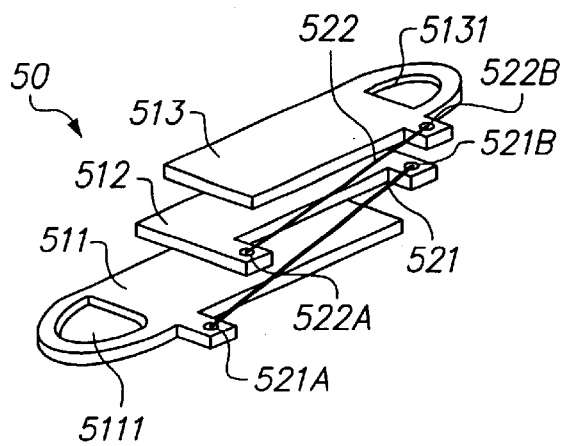
FIG. 5 shows a third embodiment of an SMA actuator of this invention.

FIG. 5 shows conceptually such a stacked plate actuator shown generally at 50, comprising three rigid conductive plates 511 through 513 connected by two SMA wires 521 and 522. Wire 521 is connected to plate 511 at attachment point 521 A and to plate 512 at attachment point 521 B, while wire 522 is connected to plate 512 at attachment point 522A and to plate 513 at attachment point 522B. Plates 521 through 523 are spaced apart and electrically insulated from one another such as by sheets of low-friction polymeric material (e.g. PTFE or another fluorinated polymer, or a polyamide such as a nylon or KAPTON) placed between them or by a coating of low-friction polymeric material applied to the plates, so that the plates may readily slide with respect to each other. Plate 511 is provided with an external attachment point shown as aperture 5111 at the end adjacent to wire attachment point 521 A, while plate 513 is provided with an external attachment point shown as aperture 5131 at the end adjacent to wire attachment point 522B. When electric power is applied to the actuator between points on plates 511 and 513, the SMA wires 521 and 522 are heated and contract, thereby moving external attachment points 5111 and 5131 closer together. The stroke of the actuator will be approximately the sum of the contraction of wires 521 and 522, and therefore about twice the contraction of each wire individually, yet the force exerted will be not substantially lower than the force exerted by each wire. It will be evident that an increased stroke for the actuator can be obtained simply by increasing the number of plates and wires.

A variation on the actuator shown in FIG. 5 is shown in FIGS. 6, 7, 8A, and 8B.

Figure 6:
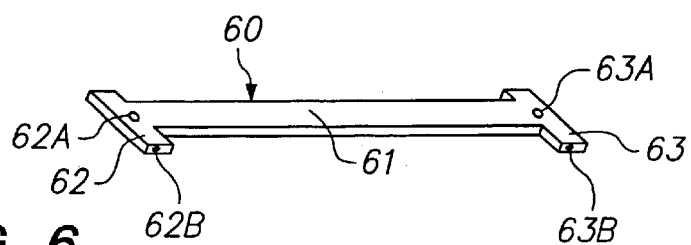
FIG. 6 shows a rigid element for an alternative third embodiment of an SMA actuator of this invention.

FIG. 6 shows an "I-beam" or "dogbone" shaped plate for this actuator. The plate shown generally at 60 has an elongate shaft 61 and ends 62 and 63. External attachment points 62A and 63A, which may, for example, be apertures into which external tendons or the like may be connected, may be present at either or both ends of the plate. Though only one end of the uppermost plate and the other end of the lowermost plate will typically be externally connected to convey the force of the actuator to an external load, it may be convenient for all plates to be made alike. Also present at ends 62 and 63 are wire attachment points 62B and 63B. These are shown at the sides of the ends for convenience, but may be attached wherever convenient. It is also possible that similar wire attachment points may be present on the other sides of the ends, thereby allowing two wires to be linked between each pair of plates and doubling the force available from the actuator.

Figure 7:
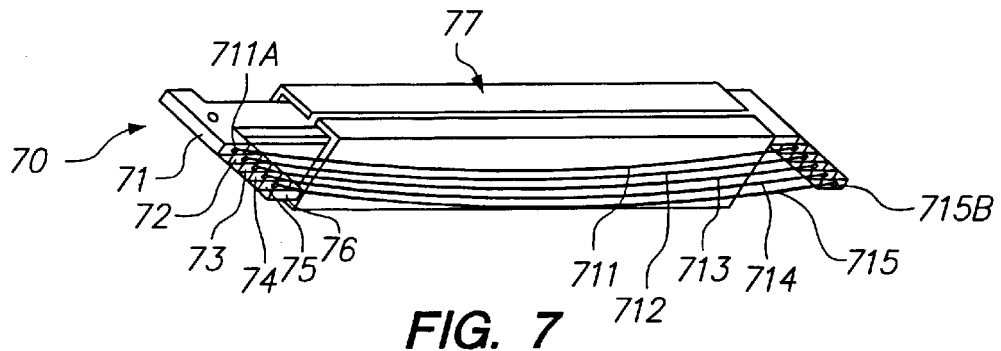
FIG. 7 is a perspective view of the alternative third embodiment of the SMA actuator using the rigid element of FIG. 6.

FIG. 7 is a perspective view showing an actuator, shown generally at 70, with six stacked plates 71 through 76 and five SMA wires 711 through 715. In this Figure, the wires are shown slack and the actuator is shown in its extended position. The plates 71 through 76, which are made of a conductive material such as brass, are held, spaced apart by insulating layers (not shown), in a case 77, which constrains the plates to move in parallel. The case 77 will typically be made of a thermoplastic polymeric material such as polycarbonate, polystyrene, or the like. Power may be applied to the actuator between points 711A (where wire 711 is attached to plate 71) and 715B (where wire 715 is attached to plate 76), or, since the plates are electrically conductive, at any places on plates 711 and 715, and a circuit will be completed through all six plate and five wires.

Figure 8A:
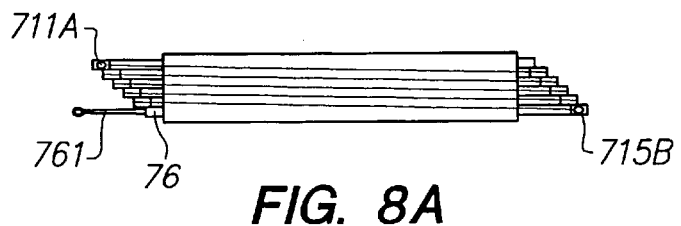
FIG. 8A shows the actuator of FIG. 7 in a side view in its extended configuration.
Figure 8B:
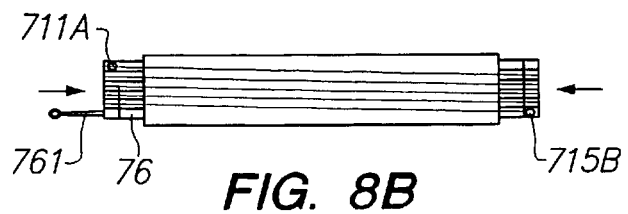
FIG. 8B shows the actuator of FIG. 8A in its contracted configuration.

FIGS. 8A and 8B are side views of a similar actuator, in which FIG. 8A (like FIG. 7) shows the actuator in an extended position, and FIG. 8B shows it in a contracted position, with the heavy arrows showing the direction of contraction. Here the contraction has been shown as being symmetrical, so that the ends of the plates align, but this is not a requirement. The stroke of this actuator will be approximately five times the contraction of any wire individually, while the force that can be exerted by the actuator will not be substantially lower than the force exerted by any wire.

Although the actuator (like all SMA actuators of this invention) operates by contraction of the SMA wire as it is heated, so that the actuator decreases in length as shown in FIG. 8B, a person of ordinary skill in the art will readily understand that is possible to extend one of the plates, such as plate 76, with an extension 761 at the opposite end of the plate from the end having attachment point 715B. By comparing the relative positions of attachment point 711A and extension 761 in FIGS. 8A and 8B, it can be seen that extension 761 extends well beyond attachment point 711A when the actuator is contracted. Thus, by appropriate extension of one of the outermost plates and fastening of the other outermost plates, an actuator based on contraction may push as well as pull.

In this variation of FIGS. 6 through 8B, as mentioned above, the SMA wires have been shown on one side only of the ends, but it is possible to have a second set of wires on the other side of the ends to double the actuating force. Also, as mentioned before, the number of plates and wires may be increased as desired to increase the stroke of the actuator.

A feature that is available to minimize the total voltage required to drive a multi-plate actuator as the number of plates increases is to use an odd number of plates (even number of SMA wires) and, instead of applying power to the actuator between the outermost plates (where the resistance of the actuator, assuming the plate resistance to be significantly lower than the wire resistance, will be the sum of the resistances of all the wires), electrically linking the outermost plates and applying power between these two outermost plates and the middle plate (where the resistance of the actuator will then be one-half the sum of the resistances of all the wires). This enables use of a lower supply voltage, although the current draw will be doubled.

In a second aspect, this invention provides a single-wire stroke-multiplying SMA actuator that achieves stroke multiplication without substantial force reduction and without resorting to a mechanically complex solution like pulleys or to mechanisms that reduce the available force.

Figure 9:
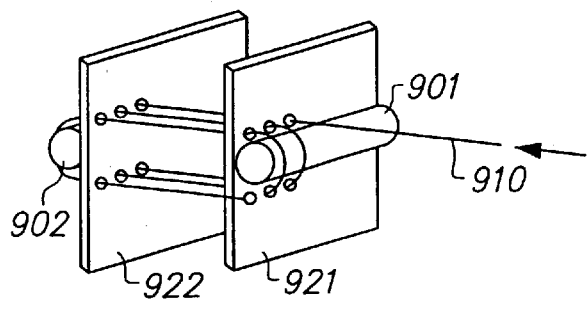
FIG. 9 shows schematically an SMA actuator of the second aspect of this invention, illustrating the use of a single SMA wire.

The basic design of this aspect of the invention, as shown schematically in FIG. 9, comprises two parallel hollow low-friction non-conductive tubes or rods 901 and 902 with an SMA wire 910 wrapped around them as if they were pulleys. The tubes/rods, which have a radius greater than the minimum bending radius of the SMA wire (as discussed previously, this minimum bending radius for repeatable austenite-martensite transition is about 50 times the wire diameter) are made of or covered with a low-friction polymeric material capable of withstanding the temperature of the SMA wire when heated. The tubes/rods are mounted on a frame, shown in the Figure as a pair of plates 921 and 922, that is rigid so that the tubes/rods are held apart at a constant distance. When the SMA wire 910 is heated (e.g. by passing an electrical current through it), it contracts and slides over the low-friction tubes/rods, causing the end of the wire to move in the direction of the arrow. Due to the low friction of nature of the tubes/rods, the SMA wire slides over it with no appreciable loss in available force, which enables thinner SMA wire to be employed resulting in greatly increased responsiveness due to the non-linear dependence of cooling speed on wire diameter. Suitable polymers for the tubes/rods or their coatings are PTFE and other fluorinated polymers. These not only can withstand high temperatures, but also conduct heat efficiently, so that the tubes/rods also act as heat sinks for the SMA wire, further improving the responsiveness of the resulting actuator. The result is an actuator that is smaller and much more responsive than could be achieved using conventional methods, but which avoids the mechanical complexity of pulleys.

Figure 10:
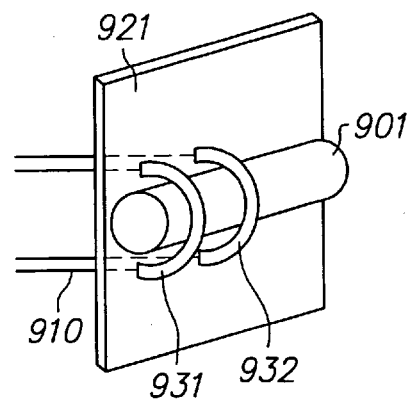
FIG. 10 shows the use of low-friction tubes to guide the SMA wire of the actuator of FIG. 9.
Figure 11:
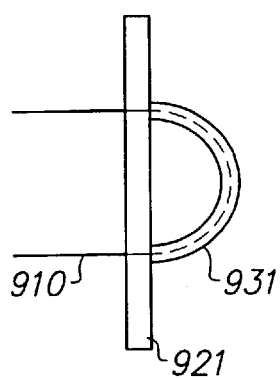
FIG. 11 shows the use of a guide tube alone.

A variation on this aspect is to use a narrow gauge tubing 931, 932; made from or internally coated with a polymer such as PTFE or other fluoropolymer and having an internal diameter slightly greater than the diameter of the SMA wire, to encase the wire as it passes over the tubes/rod 901, as illustrated in FIG. 10 (which shows only one end of the actuator, the other being similar). This arrangement increases the heat sink effect of the tubing and also permits the use of conductive tubes/rods. For small diameter SMA wires, where the force exerted on the tubing 931 by the SMA wire is low, the tube/rod 901 can be omitted as is shown in FIG. 11, which illustrates this for just a single bend in the SMA wire (it being obvious that the other bends in the SMA wire can be similarly treated).

Figure 12:
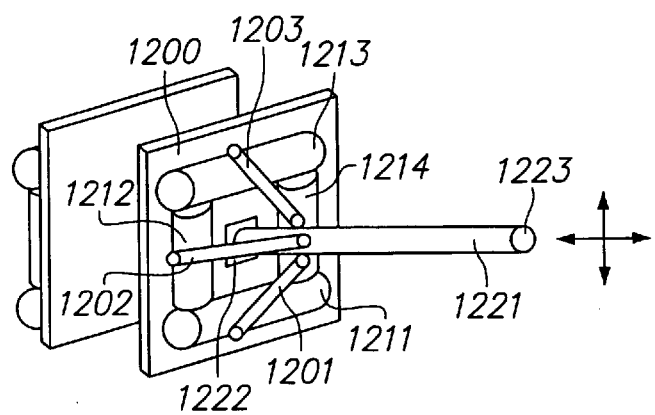
FIG. 12 shows a four-actuator assembly of this second aspect of the invention.

An example of how such actuators can be implemented is shown schematically in FIG. 12. Here four actuators are used in an antagonistic configuration to implement a two degrees of freedom joint such as might be used on a robotic hip joint. SMA wires 1201, 1202, 1203, and 1204 (not shown because obscured in this Figure by limb 1221) pass over low friction tubes/rods 1211, 1212, 1213, 1214 respectively, which are mounted on plate 1200. A similar plate and set of rods form the "back" of the actuator (shown but not numbered). Only the ends of the wire extending from the "front" of the actuator over the tubes/rods are shown, to minimize complexity and simplify understanding of the Figure, though the arrangement for each SMA wire is the same as that shown more completely in FIG. 9. By powering the SMA wires, the distal end 1223 of limb 1221, which limb is articulated from the plate 1200 through a joint 1222 such as a ball-and-socket joint, can be made to move up or down, left or right, as illustrated by the arrows at the end of the limb. Powering the SMA wires in combination can produce any desired diagonal or curved motion.

When many actuators are required in a small space the framework and tubing can be shared by multiple actuators; for example, by an opposed pair of actuators moving over the same rods but with the SMA wires leading out opposite sides of the framework. In such a case, the actuators can be independent wires, so that they are independently activated, thereby reducing the size of the paired actuator system. It is also possible to use a single wire for a pair of actuators in such a configuration, where the wire is fixed at its center. If that center is an electrical contact, each half of the wire may be independently powered, resulting in a paired but independent dual actuator system (though of course both actuators could be activated simultaneously). If that center is not used as an electrical contact, or if both endpoints of the wire are electrically linked, so that in either event the whole wire is powered, then the result is a single actuator moving and exerting a contractile force on two opposed points. Such configurations are particularly useful for symmetrical devices; such as a pair of legs on opposite sides of a multi-legged walking robot, such as an insect, spider, or centipede; and it will be readily conceivable that paired actuators can be arranged so that the opposite legs move simultaneously in one direction, e.g. both forward at once, or in opposite directions, e.g. one forward and one backward. In such specialized uses, the number of actuators and the complexity of the operating circuitry can be reduced by use of paired actuators as described here and elsewhere in this application.

Figure 13:
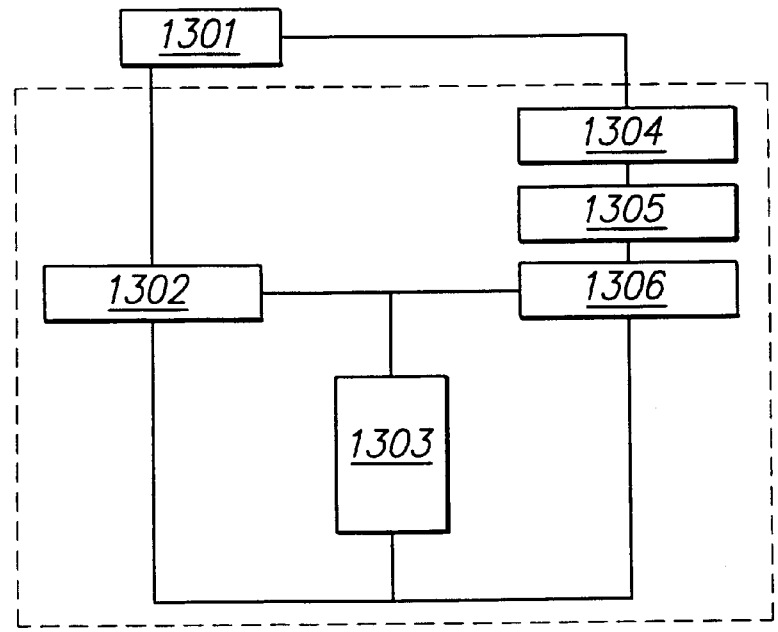
FIG. 13 shows a conventional type of PWM controller for an SMA actuator.

In a third aspect, this invention provides a very compact and simple controller mechanism for arrays of SMA actuators that are heated using the PWM scheme and which use resistance as the feedback mechanism (a technique well-known in the art, and illustrated schematically in FIG. 13). In FIG. 13, the PWM generator 1302 supplies the PWM pulse to the SMA element 1303 at a duty cycle and period specified by the controller 1301. During the off period of the PWM pulse, the resistance measuring system 1306 measures the resistance of the SMA element, which is sampled and held in the sample-and-hold system 1305. This off-period sampling avoids the risk of possible mis-sampling during a short on period. The analog signal in the sample-and-hold system 1305 is passed to the A-D converter 1304 and converted to digital form, where it can be-read by the controller 1301. This information can then be used by the controller to vary the duty cycle of the PWM generator to achieve the desired position of the SMA element. In systems with more than one SMA element, all of the systems within the dashed box in FIG. 13 need to be replicated for each actuator, adding substantially to the cost and complexity of the device containing them. It is known to multiplex the controller across a number of sample-and-hold systems, thereby reducing the number of A-D converters required to just one.

This invention avoids the duplication of high current switches required by methods such as those disclosed by U.S. Pat. No. 5,763,979 discussed above and that illustrated in FIG. 13, and uses timing control to eliminate the need for sample-and-hold systems. The resistance measuring system is also greatly reduced in complexity.

Figure 14:
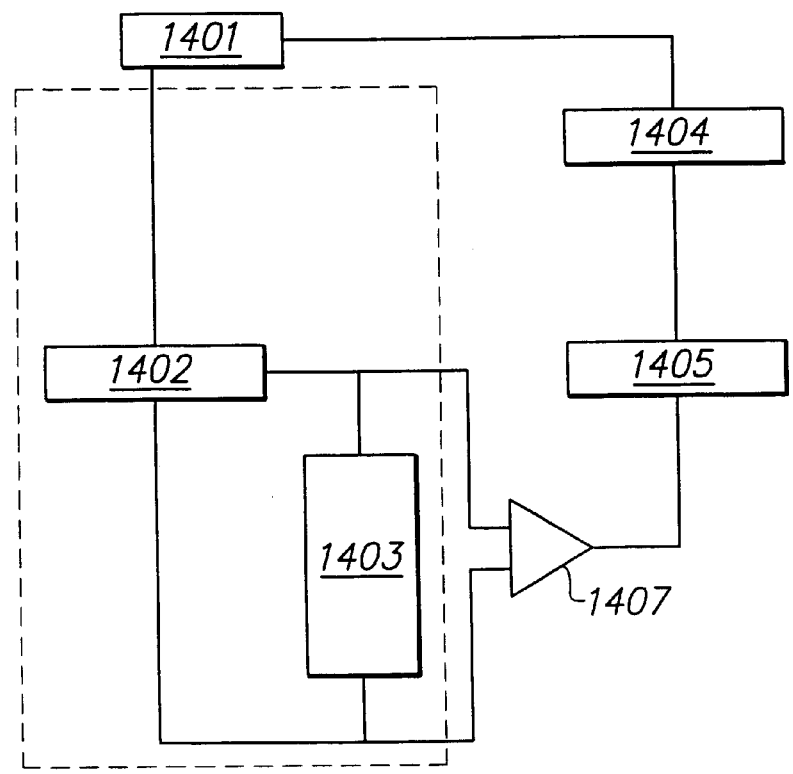
FIG. 14 shows a multiplexed PWM controller.

In this aspect of the invention, as illustrated schematically in FIG. 14 all SMA actuators have a synchronized duty cycle. An interrupt is generated in the PWM controller 1401 at the beginning of each cycle of "power on" from the PWM driver 1402 to the SMA element 1403, and the controller initiates an analog-to-digital conversion in the A-D converter 1404. In this way the PWM pulse is used as both the heating and resistance measuring voltage. The minimum duty cycle is calculated to be longer than the time it takes to perform a single A-D conversion plus an allowance for interrupt latency.

A second change from conventional design is that the inputs to the resistance measuring system 1405 are multiplexed so that the resistance measuring system and A-D converter are shared amongst all actuators. In this way, only the PWM driver 1402 is replicated for each SMA element 1403 (as shown in the dashed box). The interrupt that causes a new A-D conversion to start also selects the next actuator in turn to be sampled by programming the multiplexer 1407. Therefore, during each PWM period exactly one actuator is sampled, and when the controller initiates the conversion the PWM signal is certain to be "on". In addition, since the resistance measuring system is behind a multiplexer which is switched on only when the pulse is high it can be very simple. For example, it may comprise only a single resistor. This compares favorably with the complex current source and bridge circuits used in K. Ikuta, M. Tsukamoto, S. Hirose, "Shape Memory Alloy Servo Actuator with Electrical Resistance Feedback and Application for Active Endoscope", discussed above, which measure the resistance during the off-period of the PWM pulse. The system is also much more compact than that described in U.S. Pat. No. 5,763,979, discussed above, because it eliminates one high current switch per actuator, realizing significant space and cost savings since in most cases these switches are the largest and most expensive part of the controller.

While the multiplexer may select the actuators to be sampled sequentially in a round-robin fashion, an alternative sampling scheme increments the multiplexer to the next actuator to be sampled taking current usage of the system into account. For example, actuators with a 0% duty cycle (i.e. off) can be skipped. In many applications only a limited number of the available actuators are actively heated at a particular time, so this approach can significantly increase the sample rate of those actuators being actively controlled.

PWM control is particularly attractive because many commercial micro-controllers contain built-in hardware for generating PWM signals, reducing the computational overhead on the controller; also, PWM output is often used in sound chips (such as those used in "talking" greeting cards and the like) as an inexpensive D-A conversion mechanism, making these low cost chips suitable as controllers for SMA actuators of this invention. For example, as two-channel sound chip could be used to generate both sound and motion in a low cost compact module. In some applications, full PWM control may not be required, and an inexpensive timer chip could be used to generate the required digital signals. Also, PWM control reduces current draw when a temperature signal (in effect, an $R_{sma}$ signal) is available, because no current limiting resistor is needed to prevent overheating the SMA element. Also, because current flow in an SMA wire tends (as with all solid conductors) to be concentrated at the surface of the wire, there is the risk of "hot-spots" and uneven heat distribution, reducing the life of the wire. Pulsing the activating voltage allows for thermal conduction in the SMA wire to lead to more even heat distribution. Further, in a conventional DC control system, the SMA current is effectively constant and relatively low, because it is determined by the current-limiting resistor, the value of which is chosen to avoid overheating of the SMA element once it is fully contracted. In a PWM or pulsed scheme with resistance feedback, a high duty cycle can be used to heat the SMA element initially, leading to rapid initial movement. The duty cycle can be reduced when the SMA element reaches the desired position, supplying only enough power to maintain the SMA element in the desired state.

In a further aspect, this invention, rather than basing decisions for position control and calibration on instantaneous or peak resistance values, uses the memory and processing power of low cost embedded micro-controllers to analyze the behavior of resistance over time. This approach results in better performance for calibration and position control and also allows information to be extracted that was previously unavailable. In particular, the system can automatically adjust to SMA configurations within a wide operating range, can perform continuous calibration and position control, can detect the applied load on the actuator and can also detect mechanical obstructions of collisions between the actuator and some external object.

Auto-calibration

Figure 15:
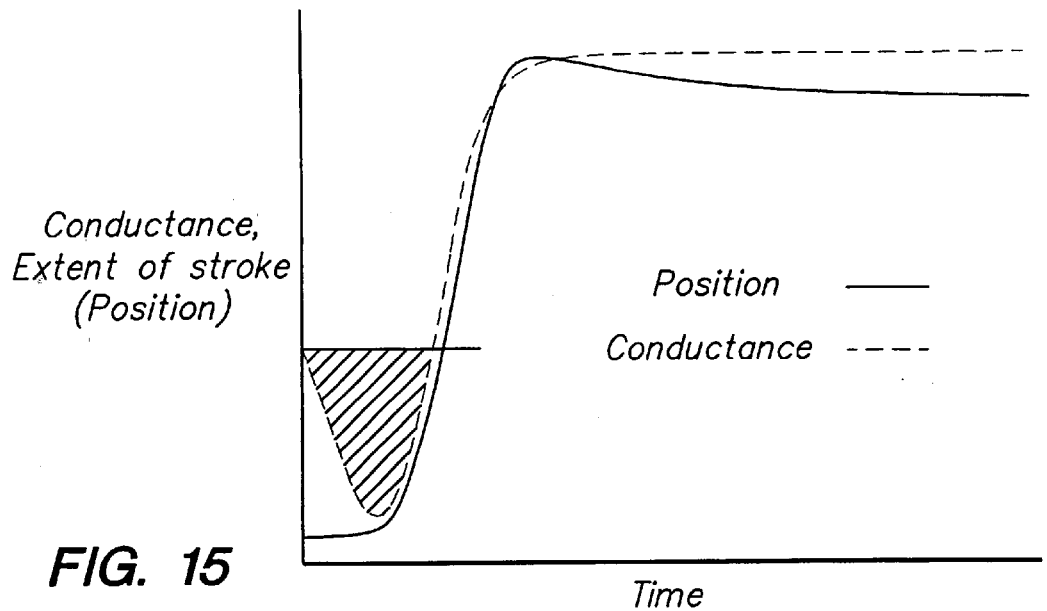
FIG. 15 is a graph showing the variation in conductance and position with time in a heated SMA element.
Figure 16:
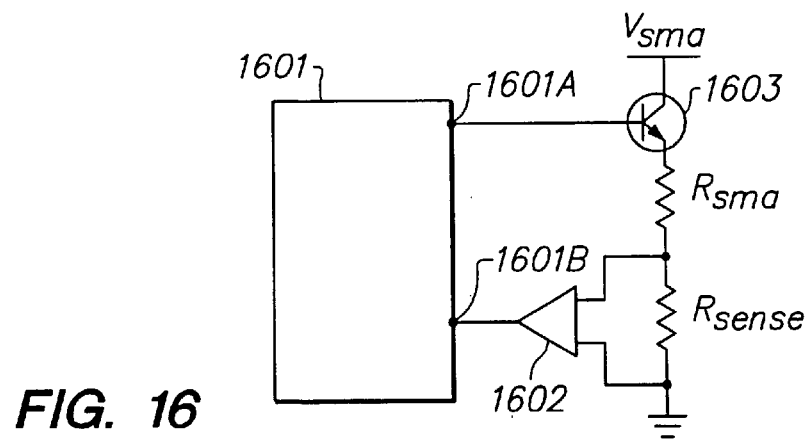
FIG. 16 shows a conventional type of resistive feedback control for an SMA actuator.

FIG. 15 shows the relationship between conductance and position of an actuator heated from below $A_s$ to above $A_f$. The change in position (extent of contraction) is plotted as a positive number versus time from the start of voltage application as a solid line; while the conductance is plotted versus time as a dashed line. The scales of position and conductance have been chosen so that the similarity of the curves can most easily be seen, illustrating the use of conductance as an analog of position. The time of heating for a typical actuator will be about 0.3–1 sec. The conductance may be measured (as illustrated in FIG. 16) by measuring the voltage drop across a sense resistor. For a constant applied voltage $V_{sma}$ applied to the SMA element, the drop in voltage across the sense resistor (which has a resistance $R_{sense}$) is directly proportional to the current flow through the SMA element and sense resistor. The conductance of the SMA element ($1/R_{sma}$) can therefore readily be calculated from the current, and hence from the voltage measured by the A-D converter 1602. This digital voltage signal is particularly-well adapted to use in the controller/PWM generator 1601. During initial heating, the conductance (1/resistance) decreases, and then after a time changes direction and starts to increase. No motion occurs until the change in conductance reverses. This point is Cmin (Rmax), and corresponds to $A_s$. Normally information in this region below $A_s$ is considered useless and is excluded from position control schemes. However, analysis and experimentation has shown that the depth and duration of this reversal is proportional to the applied load on the actuator. Thus, by electronically "drawing" a horizontal line across the resistance-position curve from Cstart (the conductance with no extension) and calculating the area between the conductance/time curve and that line (shown shaded in FIG. 15), and multiplying by the appropriate scale factor (determined experimentally), the applied load against which the actuator is working can be calculated. These measurements can be made with actuators having a stroke of only a few millimeters to a degree of accuracy that that the difference between one and two one-cent coins as applied loads can be seen.

Next in FIG. 15 can be seen an area of relatively linear relation between position and conductance followed by another reversal in conductance change. The top of conductance peak does not correspond to Rmin since, as can be seen, the position of the actuator is still changing at that point, indicating that $A_f$ has not yet been reached. Systems which use a simple peak detector for Rmin thus overestimate Rmin. Better performance is achieved by recording the value at which the conductance reaches a plateau. At this point the temperature of the alloy is at or above $A_f$ and maximum displacement has been achieved.

Since the detection of Rmin and Rmax depends entirely on the time-variance of resistance rather than its absolute value the system can dynamically adapt to SMA components of varying lengths. The constraints on the lengths that can be supported are: (1) the power supply used to heat the SMA must be capable of causing the SMA to reach the $A_f$ temperature, and (2) the resistance of the SMA must be large enough that the SMA does not reach $A_f$ and overheat more quickly than the control system can react. In practical terms this enables the same control system to adapt to SMA actuators in a wide range of sizes automatically; which is particularly attractive because in many applications the control system will be simultaneously controlling a number of actuators of different lengths simultaneously.

Resistive Feedback Control

FIG. 16 illustrates a first resistance measuring (resistive feedback) technique. Controller/PWM generator sends a PWM logic pulse from PWM output 1601A to a power switching transistor 1603 (such as an FET or bipolar transistor), which allows power to flow through the SMA element. Recognizing that the resistance change between austenite and martensite phases of an SMA element is small, typically only about 10% of the resistance of the SMA element, sensitivity of measurement is required. In FIG. 16, the $R_{sense}$ resistor is chosen to have as small a value as possible, e.g. about 1 Ω, so that the maximum current is available to heat the SMA element $R_{sma}$. This in turn means that the voltage change across $R_{sense}$ is small, and has to be amplified by an amplifier 1602 before being fed to the A-D pin of the controller/PWM generator 1601. For most practical values of the applied voltage $V_{sma}$, the voltage at the A-D converter pin may exceed the maximum acceptable voltage (typically about 5V) when the PWM signal is low, so a clamp diode may be used on the output of amplifier 1602. However, this traditionally-designed circuit requires not only that the controller 1601 have A-D conversion capability (or an A-D converter be added), but also that the circuit include a sense resistor and an amplifier 1602.

Figure 17:
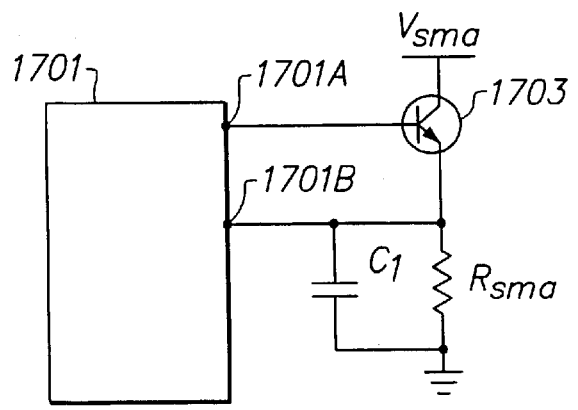
FIG. 17 shows a capacitive sensing circuit for resistive feedback control for an SMA actuator.

In an improved sensing circuit illustrated schematically in FIG. 17, both the sense resistor and the amplifier are eliminated, and the controller requires no A-D conversion capability. When the PWM signal at output 1701A of the controller/PWM generator 1701 is at logic "1" ("on"), the switching transistor 1703 permits current flow through the SMA element denoted by $R_{sma}$; and the voltage at input position 1701 B on the controller is a $V_{sma}$ less the voltage drop across the switching transistor 1703. The same voltage is seen at the non-ground terminal of capacitor $C_1$. Since the input position 1701 B is an input pin and hence of high impedance, it does not interfere with the current flow through the SMA element.

When the PWM signal from position 1701 A goes to logic "0" (during the "off" part of the duty cycle), the switching transistor 1703 switches off current flow through the SMA element, and capacitor $C_1$ immediately begins to discharge through the SMA element. Eventually the voltage at position 1701B falls below the transition threshold for that input, and the input switches from logic "1" to logic "0". By measuring the time taken for the capacitor $C_1$ to discharge once the PWM signal goes to logic "0", the RC constant for $R_{sma}C_1$ can be determined. Since $C_1$ is constant, the value of $R_{sma}$ can be determined; and, as discussed previously, this value will change during the martensite-austenite transition. A similar method comprises the SMA element and capacitor being in parallel between the switching transistor 1703 and $V_{sma}$ instead of between the transistor 1703 and ground, so that the capacitor charge time rather than the discharge time would be measured and used to determine the value of $R_{sma}$. Other similar methods employing RC time constant measurement will be apparent to a person of ordinary skill in the art in light of this disclosure.

Position Sensing

Having identified Rmin and Rmax by the above means during the first few cycles of heating and cooling, the control system can accurately report position based upon the output of a simple state machine that knows whether the wire is in the initial phase of heating, the linear section, or the top plateau.

Force Detection

After a few cycles of heating and cooling, the control system learns the size and duration of the initial resistance reversal and assumes that this is the unloaded state. In future cycles, the system can report the load as a multiple or fraction of the initial load.

Collision Detection

After a few cycles of heating and cooling, the control system develops an "expectation" of where the upper plateau will occur. If the plateau occurs at a higher resistance value than expected, then either the actuator has been mechanically obstructed or the thermal environmental conditions have changed such that the power supply can no longer provide enough power to reach A, (e.g. the SMA wire may be being cooled by thermal contact with a cool body or a cooling air stream may be impinging on it). In many application categories the probability of the change in thermal environmental conditions is low, and so the system can assume mechanical obstruction. In fact, the system can even deduce how far along the stroke the obstruction occurred based upon where in the linear part of the curve the plateau occurred.

System Failure Detection

Finally, sudden spikes in voltage or absence of voltage during heating can be interpreted by the software as either an open circuit or short circuit condition and appropriate steps can be taken to ensure a safe and orderly shutdown of the system. Fine SMA wires burn when substantially overheated and can be an ignition source in flammable environments.

While some prior SMA devices have determined position or load on a single actuator, an attractive feature of this invention is that when opposed actuators are used (as is general in sophisticated applications), measurements may be made using only the activated actuator. Measurement only on the heated contracting SMA wire avoids dealing with the inherent hysteresis of the SMA transition and enables accurate position and load measurement, and position control, since the unheated wire of the opposed but unenergized actuator functions purely as a low force constant spring force.

Since all of the features being recognized by the software are simple, very little computation (beyond some basic filtering) is required. This means that the system can be implemented entirely in hardware as an application-specific integrated circuit or in software on a low cost embedded micro-controller.

Micro-controller Features

For systems without feedback, only one micro-controller pin is required per actuator; however, if several actuators are required to be driven simultaneously (such as three legs of a six-legged walking toy), a single output pin can be used to drive several switching transistors and hence control several actuators. When spring bias is used, the number of actuators decreases; and hence a six-legged walker with spring bias requires as few as four output pins—two each ("lift" and "move forward") for each of two sets of legs. For systems with feedback, two pins are required per actuator—one for PWM output and the other for position sensing input; and if a capacitive sensing scheme is used, a timer input pin per actuator is also required. Multiplexers may of course be used if necessary to reduce the number of input pins required. The number of output pins may also be reduced by using a multi-channel driver chip, such as an Allegro UDN5832, which contains 32 high current output drivers and a serial peripheral interface over which serial bits can be sent and latched into the drivers. In systems with many SMA actuators, the computational overhead of controlling the actuators may become significant. By far the most computationally intensive activity of the controller is the generation of PWM signals for many channels and servicing the interrupts for the sensor feedback values. If the PWM signals are generated entirely in software (no PWM hardware on the chip), then an 8 MHz Motorola HC08 microcontroller can only drive about twelve actuators simultaneously. However, PWM generation can easily be implemented in hardware, and a custom chip could be developed that would contain multiplexers, PWM generators, and sensing pins, and this could communicate with the microcontroller using a serial peripheral interface, thus increasing the number of actuators that could be controlled.

EXAMPLE—A MINIATURE STROKE MULTIPLYING ACTUATOR

Figure 18:
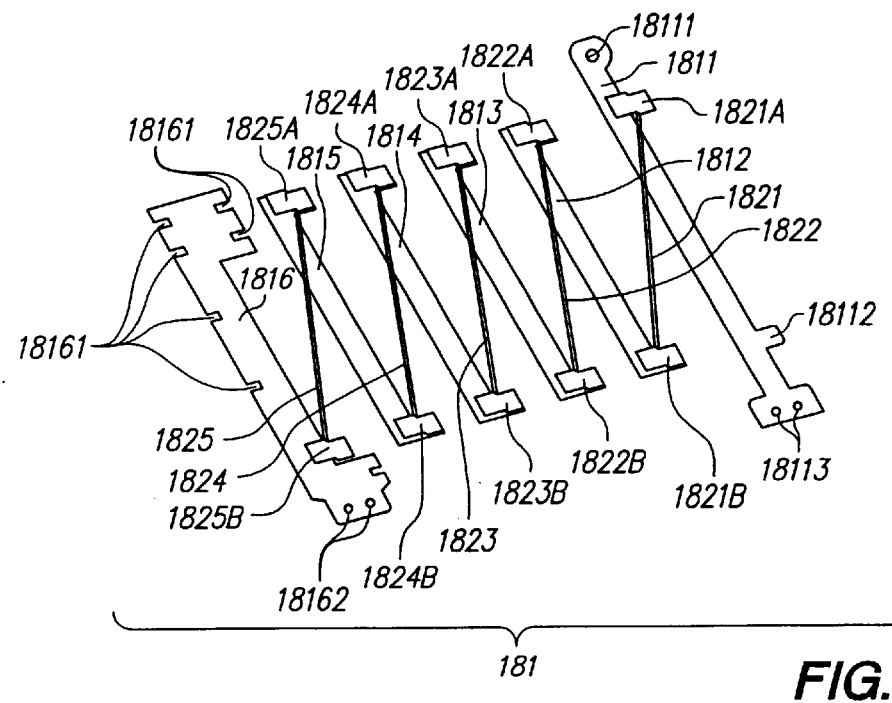
FIG. 18 shows the rigid members and SMA wires of a fourth embodiment of an SMA actuator of this invention.

FIG. 18 shows in exploded view the assembly, shown generally at 181, of the plates and wires of this embodiment. These plates will be stacked into a parallel array, with plate 1811 being the lowest, followed in succession by plates 18512 through 1815, and topped by plate 1816. Each plate is made of a material that is rigid yet soft enough to permit crimping of the material onto the SMA wires 1821 through 1825 at crimp joints 1821A and 1821B through 1825A and 1825B respectively without damaging the wires (excessive compression of the SMA wires causes fragility and change in transition properties). A suitable material for the plates is a half hard cartridge brass. Other methods of attachment of the wires may be used, but crimping is an attractive method for ease, economy, and not increasing the size of the assembled actuator. Lowermost plate 1811, which is the plate of the actuator with the greatest travel relative to uppermost plate 1816, will be provided with an attachment point 18111 for external connection to an object to be moved by the actuator, and will typically be provided with a protrusion 18112 to engage with stops to limit its travel during extension and contraction of the SMA wires and attachment point(s) shown as apertures 18113 for attachment of a power lead (not shown). Uppermost plate 1816 may be provided with indentations or apertures 18161 to enable location with respect to a case (not shown in this Figure), and will also be provided with attachment points shown as apertures 18162 to for attachment of the other power lead (not shown).

Figure 19:
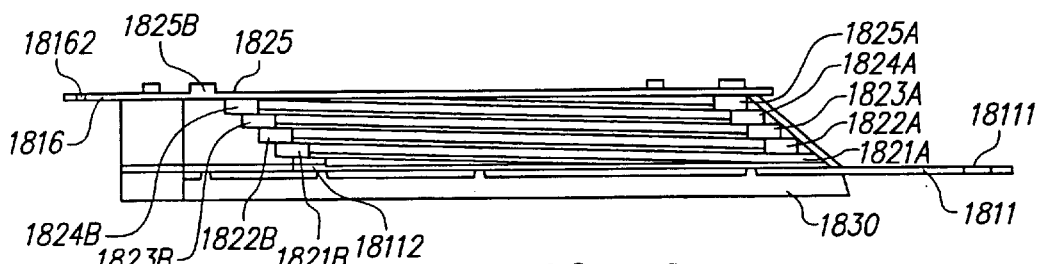
FIG. 19 is a side view showing the assembled actuator using the member/wire assembly of FIG. 18.

FIG. 19 shows the assembled actuator in a case 1830 in side view. Although each of the plates 1811 through 1816 and the crimp joints 1821A through 1825B are shown, only one SMA wire 1825 is shown, for clarity. The plate are made of half hard cartridge brass (CA 260), 0.2 mm thick, to allow adequate crimping of the SMA wires without damage and yet still give sufficient rigidity of the plates. An insulation layer (not shown) of 0.08 mm KAPTON polyamide film, type HN, is applied to the undersides of the plates, or a sheet of similar material may be placed between the plates, to ensure electrical separation of the plates and provide a low friction sliding surface. The wires are 50 µm Dynalloy Flexinol with a 90° C. transition temperature, and are attached under 10 g preload tension to avoid slack that would otherwise result in lost motion in the actuator. A suitable material for the case is an engineering thermoplastic such as a polycarbonate or equivalent. The resulting actuator has a height of 4 mm, a width of 3 mm, an extended length of 30 mm, and a contracted length of 26 mm, giving a 4 mm stroke (13% stroke/length ratio). The completed actuator weighs only 0.7 g. The actuator has a contraction force of 35 g, a return force of 4 g, and a limit force of 1 Kg, with a contraction time of 0.5 sec and a cooling time of 0.7 sec. At 6.0 V, the average current is 50 mA with a peak current of 110 mA.

Figure 20A:
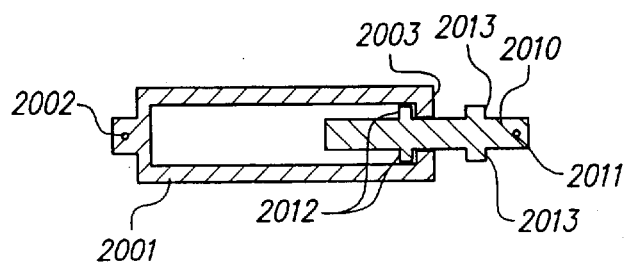
FIG. 20A shows the use of a limit stop for an SMA actuator in its fully extended configuration.
Figure 20B:
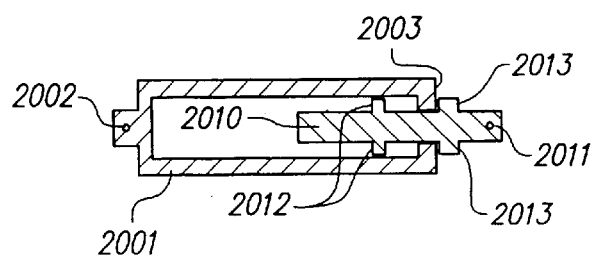
FIG. 20B shows the use of a limit stop for the SMA actuator of FIG. 20A in its fully: contracted configuration.

FIGS. 20A and 20B illustrate schematically the limit stops of an actuator, where only the furthest moving plate is shown in cross-section within a case. Case 2001, within which slides plate 2010, is provided with an attachment point 2002 to attach the actuator body to the environment of use, and has an open end defined by defined by stops 2003. The plate 2010 is provided with an attachment point 2011 to connect to the environment of use, inner protrusions 2012, and outer protrusions 2013 (the terms "inner" and "outer" being defined with respect to the case 2001). When the actuator is in its fully-extended position, as shown in FIG. 20A, inner protrusions 2012 on plate 2010 engage with stops 2003 to prevent further extension of the actuator. When the actuator is in its fully-contracted position, as shown in FIG. 20B, outer protrusions 2013 engage with stops 2003 to limit the contraction. In this way neither: (1) the application of an excessive external extension force (much greater than the force exertable by the actuator) can over-stress the SMA elements, nor (2) does the actuator contract to the limit of its capability (thus ensuring that even as the SMA elements age and lose recoverability—as is well known for SMA elements—the actuator will still move over the full range between the limit stops.

EXAMPLE—A WALKING INSECT

Figure 21:
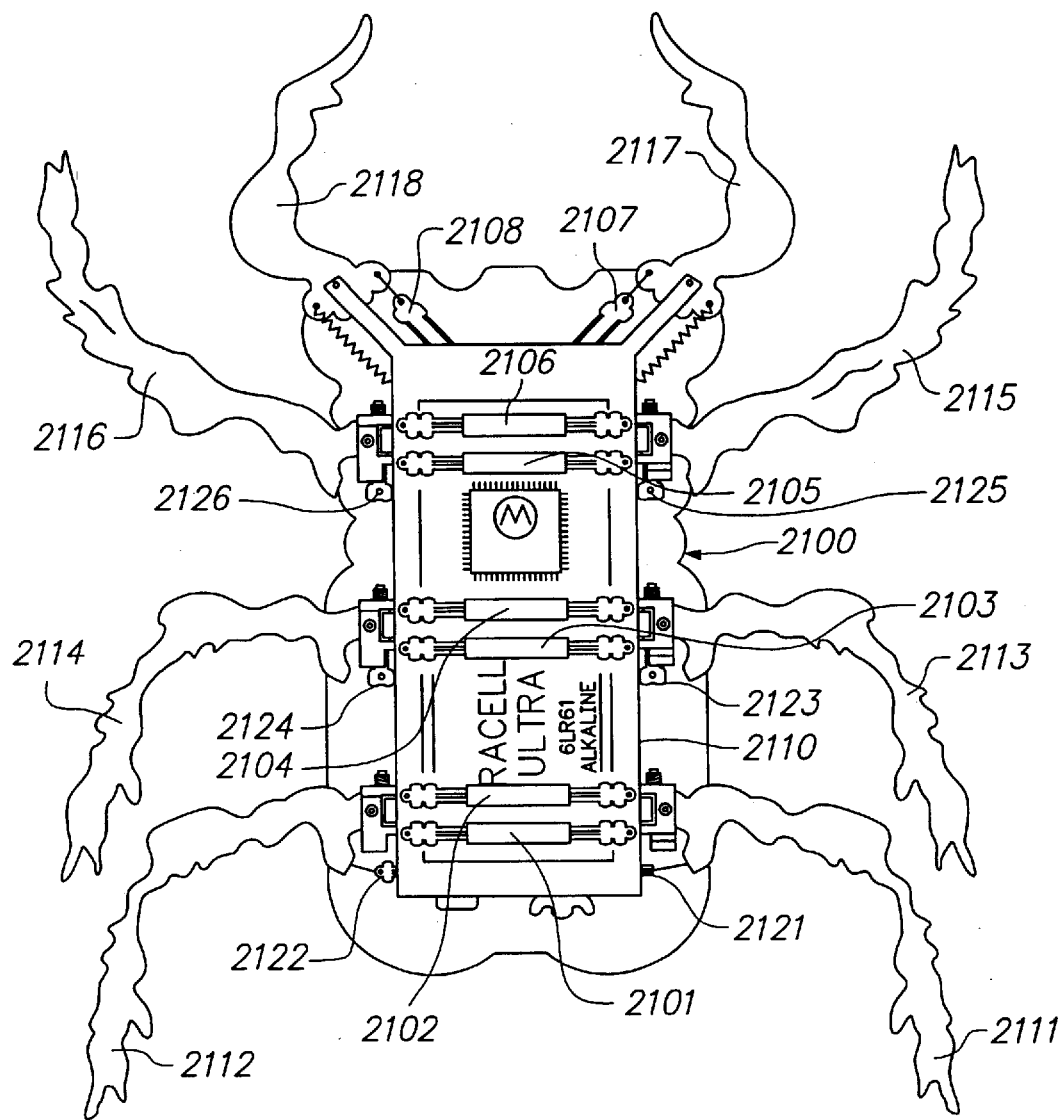
FIG. 21 shows a walking insect model containing the SMA actuators of this invention.
Figure 22:
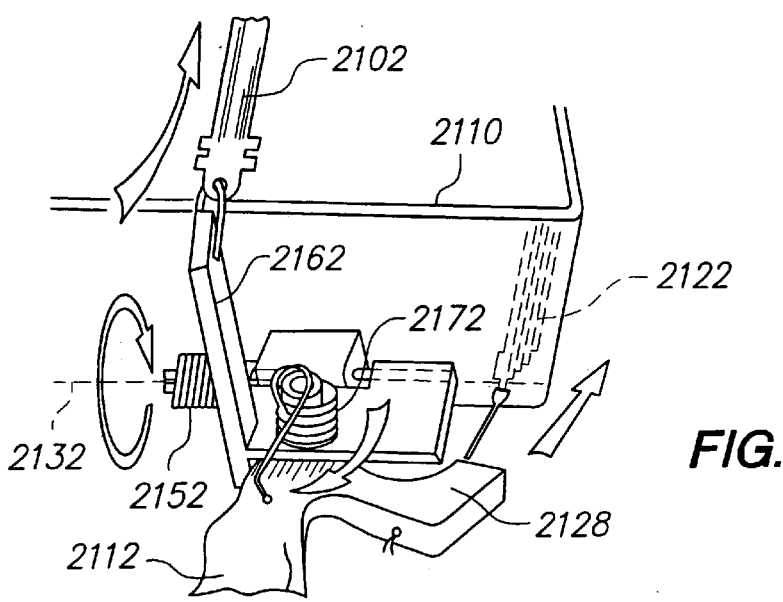
FIG. 22 is a side and above view showing the operation of one leg of the insect model of FIG. 21.
Figure 23:
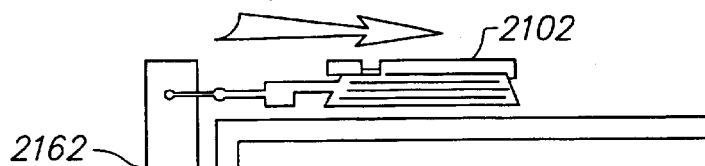
FIG. 23 is a rear view showing the operation of the leg of FIG. 22.
Figure 24:
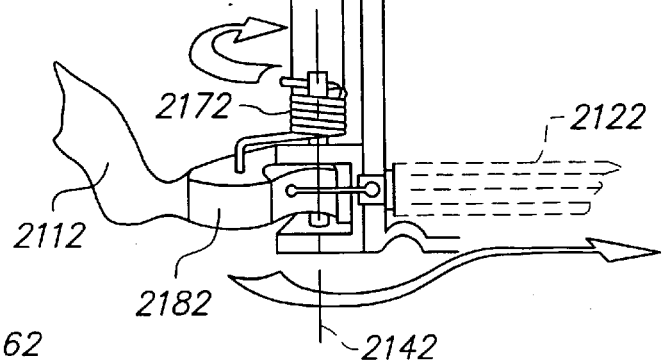
FIG. 24 is a perspective view showing the operation of the leg of FIG. 22.
Figure 24:
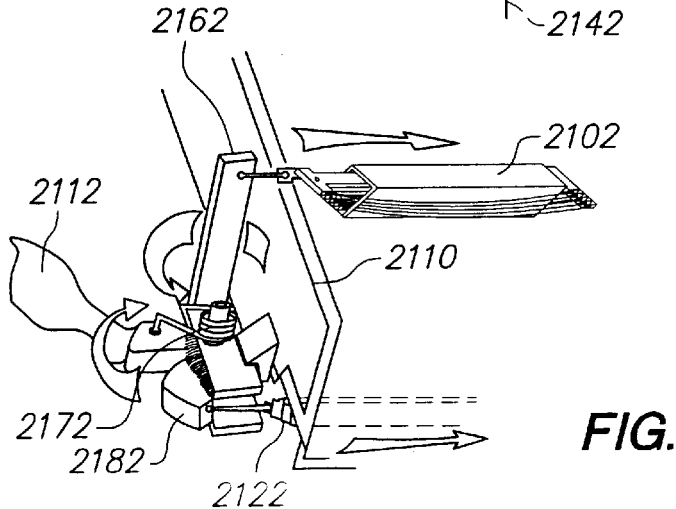

One of the many potential applications of the SMA actuators of this invention is in small mobile robots or robotic toys. One toy that has been created is a six legged robotic walking insect. SMA actuators are used to provide life-like animation and mobility. FIG. 21 shows a six-legged toy insect shown generally at 2100 with six SMA actuators 2101 through 2106 (one per leg) visible mounted above an internal body frame 2110 (11 cm×3 cm) that contains a Motorola MC68HC08MP16 microcontroller and a 9 V battery. Six similar actuators 2121 through 2126 (with ends only visible in this Figure) are mounted below the internal frame. Each actuator is connected to a corresponding leg of the toy (actuators 2101 and 2121 being connected to leg 2111, and so on). Actuators 2101 through 2016 act to lift the ends of their corresponding legs with respect to the frame 2110, while actuators 2121 through 2126 act to move the ends of the legs backward with respect to the frame 2110, as is discussed with respect-to FIGS. 22 through 24. Additional actuators 2107 and 2108 are connected to pincers 2117 and 2118 respectively, and act to close the pincers. Each of these actuators is opposed by a bias spring, not numbered, which tends to pull the end of each leg forward and downward and to open the pincers. FIGS. 22, 23, and 24 show how two SMA actuators are attached to each leg of the toy. The legs and body of the insect can be made of any suitable light-weight rigid material, such as a thermoplastic, for example a polycarbonate such as Lexan.

FIG. 22 shows a view from above and to the left side of the insect body frame, illustrating, as a representative example, the left rear leg 2112 of the insect. Two actuators 2102 and 2122 are connected to a two degree of freedom joint with axes of rotation shown by dashed lines 2132 and 2142 (in FIG. 23) where the leg 2112 meets the frame 2110. When both actuators are relaxed (extended), the spring 2152 urges the end of the leg 2112 downwardly with respect to the frame, as shown by the arcuate arrow near the spring 2152, and supports the weight of the insect so that it can stand without consuming power. When the actuator 2102 mounted on top of the frame 2110 contracts, as shown by the arrow adjacent the actuator 2102, it pulls via a tendon (not numbered) on the lever 2162, which causes the leg to rotate about horizontal axis 2132, lifting the leg. When the actuator 2102 relaxes, the spring 2152 causes the leg to return to its original position. By controlling the amount of contraction of the actuator 2102, the leg 2112 can be lifted by a specific amount. By varying the length of the lever 2162 and the force of the spring 2152, different step heights and body weights can be accommodated. When the actuator 2122 is relaxed, the leg 2112 is held forward by the spring 2172. When the actuator 2122 contracts, as shown by the arrow adjacent the actuator 2122, it pulls (via a tendon, not numbered) on L-shaped extension 2182 of the leg, causing it to rotate about axis 2142, and swinging the leg 2112 in an arc backward. When the actuator 2122 relaxes, the spring 2172 returns the leg to its original forward position, as shown by the arrow adjacent spring 2172.

By controlling the degree of contraction of each of the two actuators connected to the leg, the foot of the leg can be made to describe any arbitrary path within a rectangle defined by the range of motion of the actuators.

FIG. 23 shows the same leg viewed from the rear of the frame, more clearly illustrating the action of actuator 2102 and its opposing spring 2152; while FIG. 24 illustrates both degrees of freedom.

The remaining five legs are attached in a similar manner, as are two pincers (though these require only one actuator per pincer, as shown in FIG. 21, because they are hinged only for motion in a horizontal arc). When the insect walks, three of its feet are on the ground at any one time, and so it must be able to support itself on just three legs. Therefore the springs must each be capable of supporting at least one-third of the total weight of the insect. This in turn means that the actuators on top of the body used to lift the legs must be strong enough to overcome these springs. If the length of the lever is chosen to be-equal to the moment arm formed by the joint and the leg as it rotates about the horizontal axis, then the foot will be able to rise by the same distance as the actuator contracts. Thus an actuator which generates a nominal force of 70 grams and contracts 4 mm would be able to support an insect weighing about 200 g, which lift its feet 4 mm from the ground. In practice, the desired foot lift is usually larger to accommodate walking over rough terrain, and so the ratio of the lever to foot moment arm is reduced, resulting in a higher foot lift but lower load carrying capacity.

An inexpensive 8 bit micro-controller, such as the Motorola MC68HC08MP16 mentioned above can be used to generate the required PWM signals and to measure the changing resistance values of the fourteen actuators used. Software can then command each of the six legs to move to specific positions and to determine when that position is achieved. In this way a walking algorithm, such as the tripod gait, which is widely described in the literature [see, for example, C. Ferrell, A Comparison of Three Insect Inspired Locomotion Controllers, Massachusetts Institute of Technology Artificial Intelligence Laboratory Memorandum, Cambridge Mass., USA; and M. Binnard, Design of a Small Pneumatic Walking Robot, Massachusetts Institute of Technology, Cambridge Mass., MS Thesis, 1995] can be easily implemented; and the pincers may be made to open and close.

It will be evident to a person of ordinary skill in the art that numerous modifications may be made to such a robot or toy, for example, using a single actuator to close both pincers, using opposed pairs of actuators rather than spring-opposed actuators, etc., depending on the level of design and engineering sophistication desired. Similar design techniques may be used to accomplish any of the many tasks for which SMA actuators may be useful, and a designer/manufacturer of ordinary skill in the art of SMA actuators and their use should be able to design/manufacture SMA actuators and devices containing them without undue experimentation. It will also be evident that the sensing and control aspects of this invention are applicable generally to all SMA actuators and devices containing them, and their use is not limited to the stroke-multiplying SMA actuators of the first and second aspects of this invention. Thus the sensing and control aspects of this invention may also be used in conventional straight wire, coiled wire, or other SMA actuators such as are already known to the art and described, for example, in the documents cited in this application as representative of the knowledge of the art.

The software needed to implement the various functions, including sensing and control functions, for the SMA actuators of this invention will be readily accomplished by a person of ordinary skill in the art of SMA actuators and their use, having regard to their skill and the information available to such a person, including the documents referred to in this application, and the disclosure herein.

As discussed in the Summary of the Invention, this invention also includes other actuators using electromechanically active materials (materials that expand or contract on the passage of an electric current or the application of an electric potential to them other than through the normal processes of thermal expansion and contraction of the type that are normally linear with temperature over a wide temperature range). Such materials include, for example, piezoelectric materials and certain electro-active polymers. These materials typically exhibit only very limited expansion or contraction when electrically activated, and devices employing them as actuators will typically be adaptable to stroke multiplication of the type discussed in this application in detail for actuators comprising shape memory alloy elements. Also, the control and sensing techniques will be equally appropriate for such other actuators. Thus, when the term "SMA actuator" is used herein, unless the context makes it apparent that it refers only to an actuator comprising shape memory alloy elements, it should be construed as including actuators employing elements comprising electromechanically active materials, especially shape memory alloys.

Various modifications and variations of the present invention will be apparent to a person of ordinary skill in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to persons of ordinary skill in the art are intended to be within the scope of the following claims.

What is claimed is:

1. A shape memory alloy actuator, comprising:
    a set of stacked parallel conductive plates, wherein each stacked parallel conductive plate is separated from an adjacent stacked parallel conductive plate with an insulating layer configured to provide electrical isolation between adjacent stacked parallel conductive plates and a low-friction sliding surface between adjacent stacked parallel conductive plates; and
    a set of shape memory alloy links connecting said set of stacked parallel conductive plates, said set of shape memory alloy links generating force to produce controlled sliding displacement along insulating layers between adjacent stacked parallel conductive plates.

2. The shape memory alloy actuator of claim 1 wherein said insulating layer is a low-friction polymeric material.

3. The shape memory alloy actuator of claim 2 wherein said insulating layer is PTFE.

4. The shape memory alloy actuator of claim 2 wherein said insulating layer is fluorinated polymer.

5. The shape memory alloy actuator of claim 2 wherein said insulating layer is polyamide.

6. The shape memory alloy actuator of claim 5 wherein said insulating layer is nylon.

7. The shape memory alloy actuator of claim 1 wherein said insulating layer is placed between adjacent stacked parallel conductive plates.

8. The shape memory alloy actuator of claim 1 wherein said insulating layer is applied to a conductive plate of adjacent stacked parallel conductive plates.

9. The shape memory alloy actuator of claim 1 wherein each stacked parallel conductive plate of said stacked parallel conductive plates has wide end plates connected by a narrow central elongated surface to form a dog bone configuration.

10. The shape memory alloy actuator of claim 9 wherein said shape memory alloy links are connected to said wide end plates of said stacked parallel conductive plates.

* * * * *